(12) United States Patent
Hobson et al.

(10) Patent No.: US 6,209,016 B1
(45) Date of Patent: Mar. 27, 2001

(54) CO-PROCESSOR FOR PERFORMING MODULAR MULTIPLICATION

(75) Inventors: Russell Hobson, Glasgow (GB); Peter McGinn, Austin, TX (US)

(73) Assignee: Atmel Research, Georgetown (KY)

( * ) Notice: Subject to any disclaimer, the term of this patent is extended or adjusted under 35 U.S.C. 154(b) by 0 days.

(21) Appl. No.: 09/091,376
(22) PCT Filed: Oct. 22, 1997
(86) PCT No.: PCT/EP97/05981
  § 371 Date: Jun. 3, 1999
  § 102(e) Date: Jun. 3, 1999
(87) PCT Pub. No.: WO98/19231
  PCT Pub. Date: May 7, 1998

(30) Foreign Application Priority Data

Oct. 31, 1996 (GB) ................................. 9622714
Oct. 31, 1996 (GB) ................................. 9622718

(51) Int. Cl.[7] .................................................. G06F 7/00
(52) U.S. Cl. ................................................... 708/491
(58) Field of Search .............................. 708/491, 492; 380/28

(56) References Cited

U.S. PATENT DOCUMENTS 5,742,530 * 4/1998 Gressel et al. ................ 708/491

* cited by examiner

*Primary Examiner*—Chuong Dinh Ngo
(74) *Attorney, Agent, or Firm*—Thomas Schneck

(57) ABSTRACT

A co-processor (FIG. 2) for performing modular multiplication comprising: means for receiving B and N binary data streams (bstr, nstr); means for receiving a data value A; adder means (Add1, Add2), subtractor means (Sub1, Sub2, Sub3) and multiplier means (Mul1, Mul2) coupled to sequentially process the B and N binary data streams and the data value A to produce a modulo-reduced multiplication value (A*B) mod N; and further including exponentiation means (FIG. 6) comprising: random access memory (E-RAM) for holding an exponent value; parallel-serial interface means for receiving in parallel from the random access memory the exponent value and for producing therefrom a binary data stream E; control means (CONTROL) for receiving the binary data stream E and for initiating a squaring or a multiply operation in dependence on the value of each bit thereof.

7 Claims, 6 Drawing Sheets

CO-PROCESSOR FOR PERFORMING MODULAR MULTIPLICATION

FIELD OF THE INVENTION

This invention relates generally to a co-processor for performing modular multiplication and particularly, though not exclusively, for implementing the Montgomery Reduction Algorithm.

BACKGROUND OF THE INVENTION

Modular multiplication is extensively used in implementing cryptographic methods such as RSA cryptography.

The Montgomery algorithm is one of the most efficient techniques for performing modular multiplication. Its use is particularly effective where high performance is required so as to minimise the computation time.

The Montgomery proof is given in Appendix 1 and the Montgomery Reduction Algorithm is outlined below:

Montaomery Algorithm To enact the P operator on A.B we follow the process outlined below:
- (1) $X = A.B + S$ {S initially zero}
- (2) $Y = (X.J) \bmod 2^n$ (where J is a pre-calculated constant)
- (3) $Z = X + Y.N$
- (4) $S = Z/2^n$
- (5) $P = S \pmod N$ (N is subtracted from S, if $S \geq N$)

Thus P $P(A.B)_N$ (the result in the Montgomery Field of numbers)

In financial applications where smartcards are used as a means of ensuring a high level of security during the transaction, Public Key Cryptography is becoming increasingly popular. Public Key Cryptography offers a higher level of protection than the traditional symmetric or private key methods but until recently has been expensive to implement. Advances in technology have now made the implementation of such methods cost effective. RSA Public Key capability has been designed into smartcard microcontrollers which also include an on-chip co-processor which has been specifically designed to perform modular multiplications for operands each of 512 bit length. The co-processor is directly driven by the microcontroller's CPU under software control by a program stored either in ROM or in EEPROM. Such a co-processor which implements the Montgomery algorithm for modular reduction without the division process and is known from European Patent Publication EP-0601907-A.

As will be discussed in detail hereafter, such a known co-processor suffers from a number of disadvantages.

BRIEF DESCRIPTION OF THE DRAWINGS

One co-processor for performing modular multiplication to implement the Montgomery Reduction Algorithm will now be described, by way of example only, with reference to the accompanying drawings, in which.

DETAILED DESCRIPTION OF A PREFERRED EMBODIMENT

Known Co-Processor Operation

Figure 1:
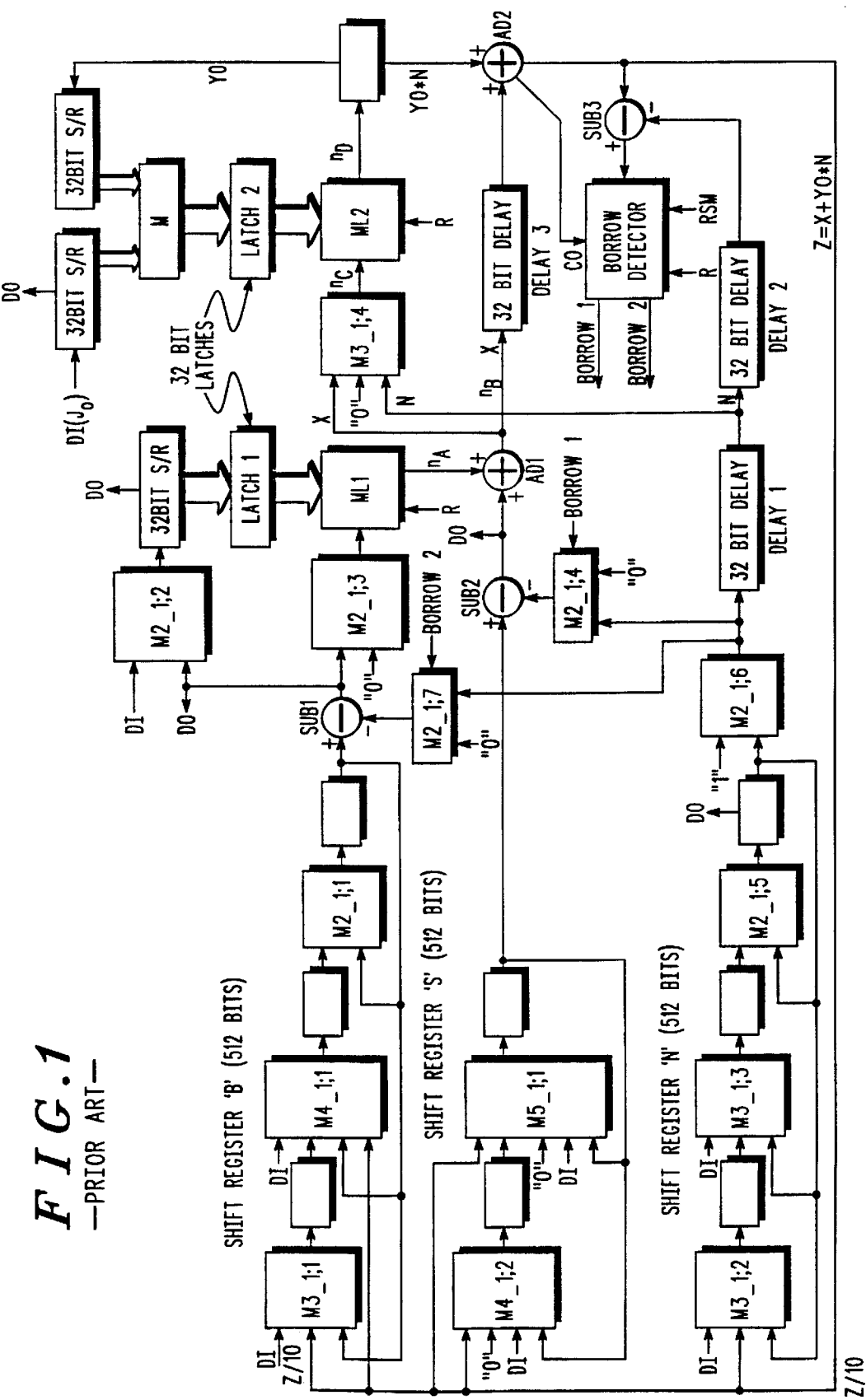
FIG. 1 shows a block schematic diagram of a known, prior art co-processor for performing modular multiplication to implement the Montgomery Reduction Algorithm.

FIG. 1 shows a diagram of a known, prior art hardware implementation of a co-processor which performs the Montgomery algorithm for both full mode 512 bit and half-mode 256 bit operands.

The diagram shows the execution unit which comprises basically three 512 bit clocked shift registers and two parallel-serial multipliers.

The B value and the modulus N are preloaded into the B and N registers respectively. Register S is used to store the intermediate result after each rotation of 512 clock cycles. Initially this register will be cleared. The pre-calculated Montgomery Constant, Jo, is loaded into the co-processor via a 32 bit shift register and latched in Latch2.

The A value is shifted in 4 bytes (32 bits) at a time, $(A_i)$ via multiplexer M2_1;2 and latched in Latch1. The value in the B register is serially clocked one bit at a time into a first parallel-serial multiplier ML1. The output of this multiplier, at node $n_A$, is the value $A_i{*}B$. The value $A_i{*}B$ is then summed at adder Ad1 to the intermediate value stored in register S to produce the value $X = A_i{*}B + S$.

For the first 32 clock cycles, the first 32 bit portion of the X value is fed via multiplexer M3_1;4 into a second parallel-serial multiplier ML2, where it is multiplied by the value $J_0$. The output from ML2 at node $n_D$ is the value $Y_0 = A{*}B{*}J_0$. $Y_0$ is fed back through a 32 bit shift register and latched in Latch2 via multiplexer M.

After the first 32 clock cycles, multiplexer M3_1;4 switches and feeds the modulus N into the multiplier ML2, where N is multiplied by $Y_0$ to produce the value $Y_0{*}N$. This value is then summed, over the next 544 clock cycles, with X at adder Ad2 to produce the value $Z = X + Y_0{*}N$. The last 32 bits of this calculation are zero and only the 512 most significant bits are saved back in the S register. This completes one full rotation.

Sixteen rotations, using a 32 bit multiplication, are required to perform the full 512 bit by 512 bit multiplication, which gives:

$$P = A.B.I(\bmod N) = P(A.B)_N \text{ (the result in the Montgomery Field of numbers).}$$

To recover the required result P is multiplied by H (a pre-calculated Montgomery constant) to give the result in the field of real numbers:

$$R = A.B \ (\bmod N) = P(P.H)_N$$

RSA Public Key Cryptography

Implementing the RSA public key cryptographic system requires calculating values of the form $M^d \pmod N$ where the exponent d may be up to n bits long (where n is the number of binary digits in N). This is done by performing repeated squaring operations and multiply operations depending upon the value of each bit of the exponent value, d taken in sequence. For a 512 bit exponent, approximately 768 modular operations are required. This leads to the following performance calculation for a 512 bit RSA signature at a clock rate of 20 MHz:

$$t_{rsa}=(544*16*50*768)*10^{-6} \text{ mS}$$

$$t_{rsa}=334.23 \text{ mS}$$

Disadvantages of the Known Co-Processor Architecture

The known co-processor architecture shown in FIG. 1 is integrated onto a single silicon chip together with a microcontroller. The co-processor is directly driven by the microcontroller's CPU under software control by a program stored either in ROM or in EEPROM. Such a known co-processor arrangement suffers from a number of drawbacks:

The co-processor performance is severely limited owing to the interaction with the software drivers, The CPU is restricted by the co-processor dependence on the CPU providing the $A_i$ value during the calculation, The fixed length of the clocked shift registers make the co-processor inflexible. It is not possible to handle bit lengths less than the fixed 512 or 256 bit key length efficiently. It still requires 544 or 288 clock cycles per rotation.

Because the co-processor has a fixed register length of 512 bits, it becomes unwieldy to handle key lengths greater than 512 bits. This leads to a high CPU overhead for key lengths greater than 512 bits (see timings in Table 1 below)

Because the co-processor utilises fixed length, clocked shift registers, data has to be loaded and unloaded from RAM into the co-processor in a timely fashion. This involves CPU overhead and can lead to data starvation in some instances where the CPU cannot supply the co-processor fast enough. This is particularly true when the co-processor is operating in half-mode and performing calculations using the Chinese Remainder Theorem (CRT).

Clocking three 512 bit shift registers, leads to a high power consumption and leads to a difficult design problem in terms of a clocking scheme especially when an increase in computational performance is attempted by raising the clock frequency.

In an RSA Public Key Signature/Authentication scheme where modular exponentiation is required, the current architecture requires the direct intervention of the CPU to control the exponentiation process.

The co-processor is a single serial loop design in that the binary digits are serially shifted one bit at a time per clock period through one-bit adders, subtracters and 32 bit by 1 bit parallel-serial multipliers.

To generate an RSA signature, if the prime factors (p & q) of N are known then it is possible to use the Chinese Remainder Theorem (CRT) to substantially speed up the calculation time. Appendix 2 states the Chinese Remainder Theorem and details its application to RSA. The current architecture is simply a modular multiplier and does not allow easy implementation of CRT. As a result a substantial CPU overhead tends to negate the advantage of using CRT.

Typical performance times (CPU time, co-processor time and total time) for the known co-processor arrangement processing different lengths of signature using the Chinese Remainder Theorem are:

TABLE 1

|  | CPU | Co-processor | Total |
|---|---|---|---|
| 512 bit CRT Signature | 95.5 mS | 92 mS | 187.5 mS |
| 768 bit CRT Signature | 568 mS | 348 mS | 916 mS |
| 1024 bit CRT Signature | 375 mS | 680 mS | 1055 mS |

New, Improved Co-Processor

Figure 2:
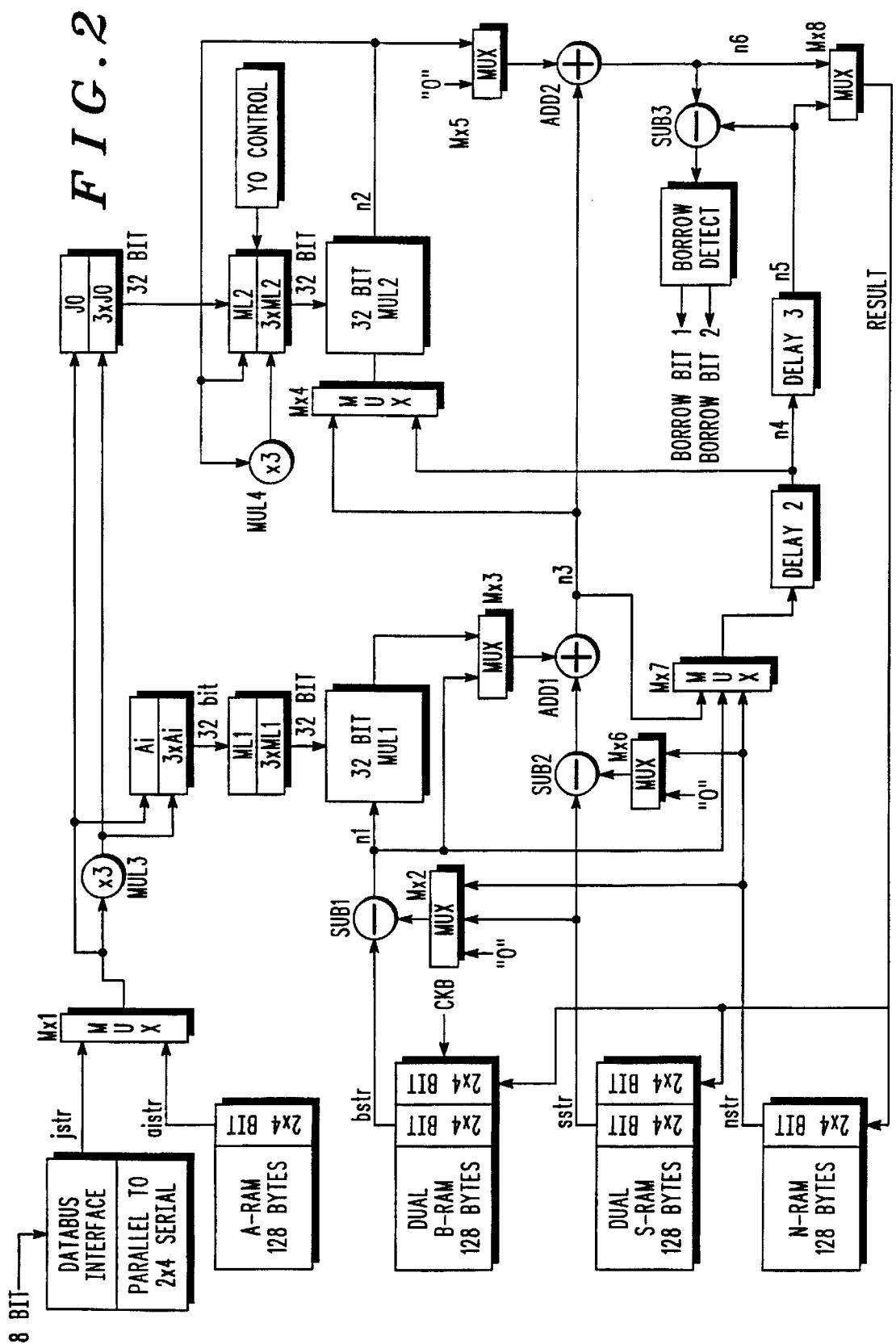
FIG. 2 shows a block schematic diagram of a new, improved co-processor for performing modular multiplication to implement the Montgomery Reduction Algorithm.

Referring now to FIG. 2, a new co-processor as shown offers improved performance and flexibility to overcome the disadvantages of the known co-processor, as discussed above. Features of the new co-processor which provide the improvements will be discussed in detail below (descriptions typically refer to 512 bit calculations for convenience):

Bit Pair Calculation

The new co-processor uses bit-pair multiplication, addition and subtraction. Instead of using a single serial loop clocking scheme as in the co-processor of FIG. 1, the serial bit stream in the new improved co-processor is examined two bits at a time per clock period.

As will be described in detail below, each serial bit stream is split into two (odd and even) component bit streams (bits from the originating serial bit stream being fed alternately into the two component serial bit streams respectively) and the two component bit streams are processed in parallel, one bit being presented by each of the component bit streams at the same time to form a bit-pair for calculation. This means that the adders, subtracters and parallel-serial multipliers evaluate and compute results two bits at a time. This change in architecture immediately doubles the performance for the same clock frequency. An immediate advantage is that the computational throughput is almost doubled without a corresponding doubling of power dissipation.

Figure 3:
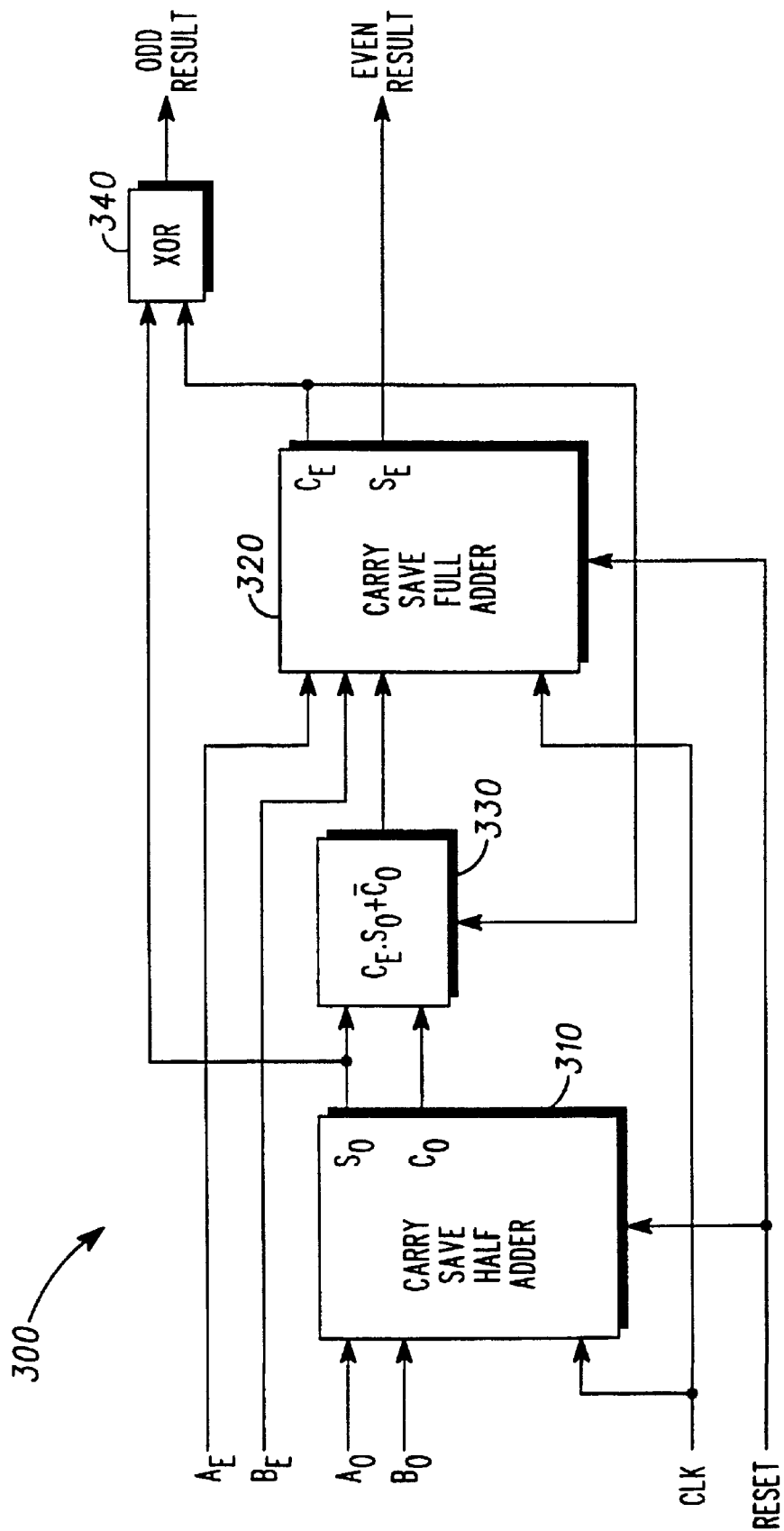
FIG. 3 shows a block schematic diagram of a bit-pair adder stage used in the co-processor of FIG. 2.

Referring now also to FIG. 3 (which shows a bit-pair adder 300 forming the basis of the new co-processor's bit-pair multipliers, adders and subtracters), the new co-processor's bit-pair multiplication, addition and subtraction is implemented as follows:

Initially the elements of the adder are set to zero.

The bits $A_o$ and $B_o$ from the odd data stream are added in a carry-save half-adder 310 to produce odd sum and odd carry outputs $S_o$ and $C_o$ respectively.

The bits $A_E$ and $B_E$ from the even data stream are input to a carry-save full-adder 320 which produces even sum and even carry outputs $S_E$ and $C_E$ respectively.

The signals $S_o$ and $C_o$ are logically combined with the signal $C_E$ in logic 330 to produce a signal $C_E \cdot S_o + \overline{C_o}$, which is input to the full-adder.

The signals $S_o$ and $C_E$ are XORed in logic 340 to produce the odd bit result of the bit-pair addition, and the signal $S_E$ forms the even bit result of the bit-pair addition.

The bit pair subtracter uses the same circuitry as the bit-pair adder 300 described above, except that for use as a subtracter the initial values CE and SO are set to logical "1" and the data stream to be subtracted is inverted before input to the half-adder 310 and full-adder 320, respectively. The subtraction is thus achieved by two's complement addition.

The bit-pair multipliers (which are 2- by 32-bit multipliers) are formed using bit-pair adders 300 as described above.

As the odd and even bits of the serial data streams are presented to the multiplier, the multiplication process proceeds by addition as follows:
- if the two input serial data bits are "00", a zero value is added;
- if the two input serial data bits are "01", the 32-bit value is added;
- if the two input serial data bits are "10", the 32-bit value is left-shifted by one bit, then added;
- if the two input serial data bits are "11", a pre-calculated value of three times the 32-bit value is added.

Improved $Y_0$ Calculation

As described above, the new co-processor uses a bit-pair multiplication scheme to enhance performance. In the known architecture, shown in FIG. 1, this would have involved greatly complicating the $Y_0$ control, by adding additional logic and a 3× function to both the $J_0$ and $Y_0$ paths feeding multiplier MUL 2. This complication has been avoided as shown in FIG. 2.

Referring to FIG. 1, in the known architecture, at the start of a rotation, for the first 32 clocks cycles, $J_0$ is multiplied by X=A*B+S. The result $Y_0$ is fed back during these first 32 clock cycles and latched in Latch2, after which time $Y_0$ is fed into MUL2 and used to generate the product $Y_0$*N over the following 512 clock cycles.

Figure 4:
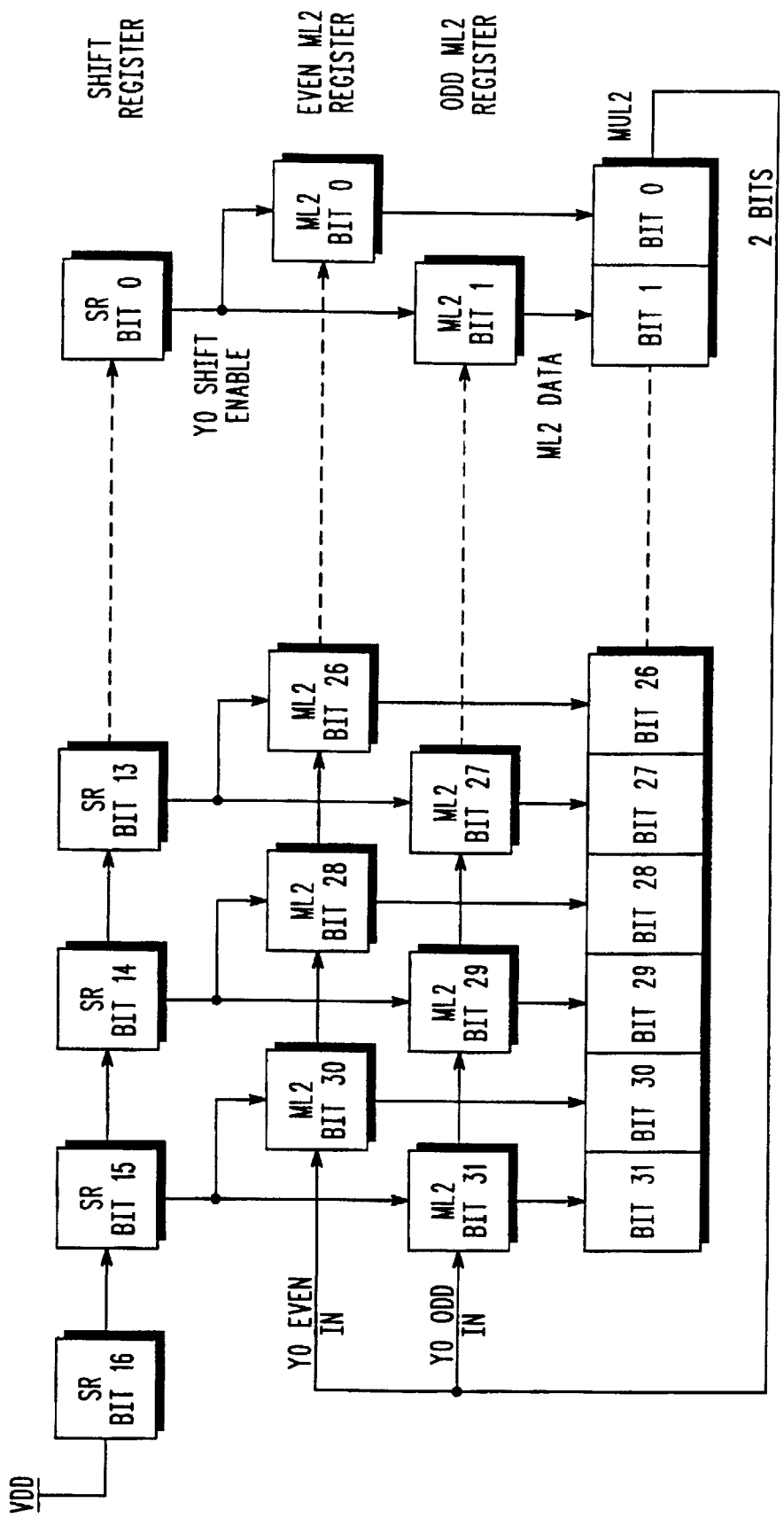
FIG. 4 shows a block schematic diagram of a multiplier and associated circuitry used in the co-processor of FIG. 2.

Referring now to FIGS. 2 and 4, in the new co-processor $J_0$ is initially loaded into latch ML2. Register SR is cleared except for SR_bit16 which is set. The output of SR_bitk if a logical 1, will enable data to be clocked through the latch ML2 from the MSB down to the kth bit pair. After the first clock cycle in any given rotation, bits 31 and 30 in ML2 are no longer required and the first two bits of $Y_0$ can be fed back and latched into ML2_bit31 and ML2_bit30. During the first clock cycle the logical 1 at SR_bit16 is clocked to SR_bit15, at which point ML2_bit31 and ML2_bit30 are enabled. On the second clock cycle the logical 1 at SR_bit15 shifts to SR_bit14. SR_bit15 is reloaded with a logical 1 and now ML2_bit31, ML2_bit30, ML2_bit29 and ML2_bit28 are enabled. The next two output bits from MUL2 are clocked into ML2_bit31 and ML2_bit30. The bits previously in ML2_bit31 and ML2_bit30 are shifted to ML2_bit29 and ML2_bit28 respectively. The process repeats until after 16 clock cycles, 32 bits of $Y_0$ have fed back and loaded into ML2. On the subsequent 256 clock cycles $Y_0$ is multiplied by the modulus N.

For the next rotation, $J_0$ is re-loaded into ML2, SR_bit15 to SR_bit0 is cleared and SR_bit16 set and the process is repeated.

This implementation obviates the need for one 34 bit shift register, one 32 bit shift register, one 34 bit multiplexer and one 32 bit multiplexer that would otherwise have been necessary for a direct implementation of the bit-pair multiplication scheme, and uses instead one 17-bit shift register.

Register Replacement

As discussed above, the known architecture utilises three 512 bit clocked serial shift registers (B, S and N registers). Data (i.e. value B and modulus value N) are loaded from memory into the B and N registers respectively by the CPU via a bus interface. The CPU feeds the A value into the co-processor, 4 bytes at a time. The CPU subsequently loads the result back into memory from either the B or S register once the calculation is complete. This scheme consumes power and adds CPU overhead.

Figure 5A:
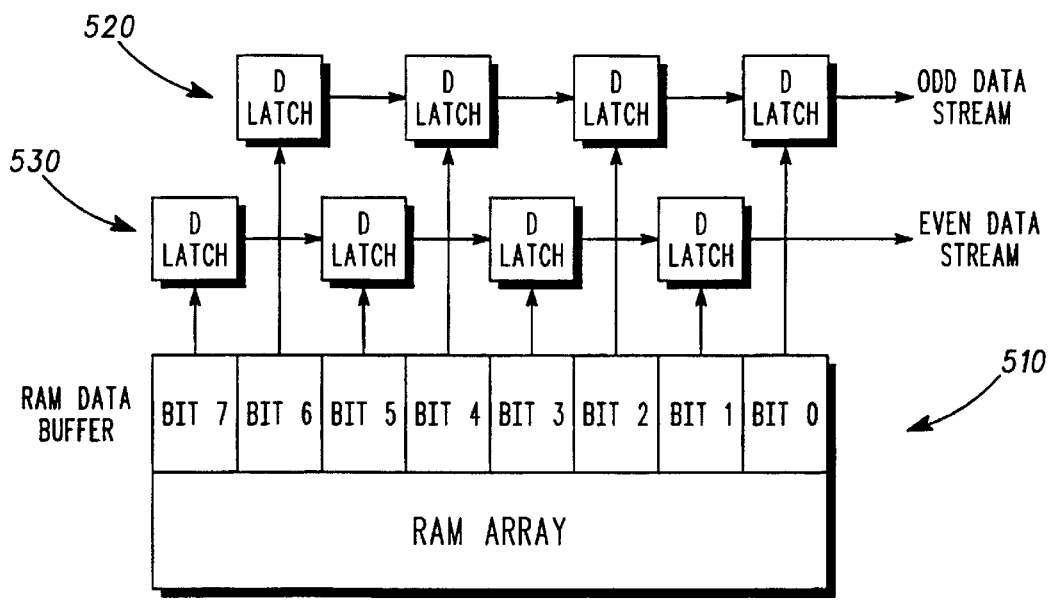
FIG. 5A shows a block schematic diagram of an arrangement used in the co-processor of FIG. 2 for generating component serial bit streams from random access memory utilising a parallel-serial interface.

Referring now to FIG. 5A, in the new co-processor the previous fixed length, clocked shift registers have now been replaced by making use of a simple 8 bit parallel to serial interface 510, placed between the RAM and the modular multiplier, together with an automatic RAM pointer mechanism. (See FIG. 6) Here each alternate bit is loaded into a 4 bit clocked shift register. There are two such 4 bit clocked serial shift registers 520 and 530 forming the odd and even component serial bit streams. These two component serial bit streams are then fed into the modular multiplier.

Figure 5B:
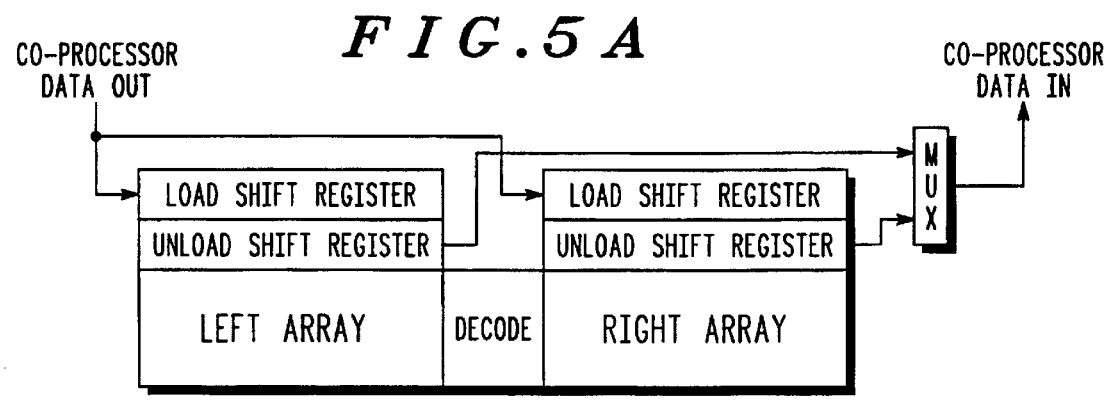
FIG. 5B shows a block schematic diagram of a dual port register arrangement used in the co-processor of FIG. 2.

FIG. 5B shows the arrangement for writing data back into the RAM. The RAM is configured with a double sided or "dual port" arrangement, where right and left side arrays share a central row decoder. With this arrangement, for a given decoded row, data can be read from the left side array while at the same time data is being written back into the right side array.

The advantage of this scheme is that data in RAM is never loaded into registers by the CPU via load and store instructions, data is simply downloaded into the serial interface automatically when needed by the co-processor. The fact that each 512 bit clocked shift register is replaced by an 8-bit clocked shift register interface (FIG. 5A) significantly reduces power consumption.

Figure 6:
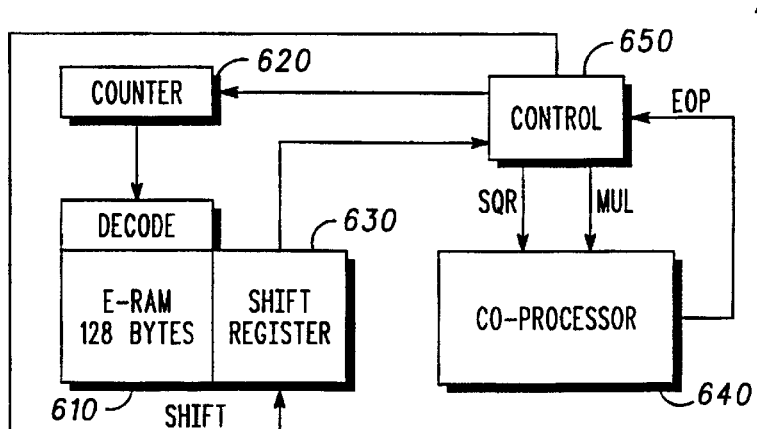
FIG. 6 shows a block schematic diagram of an arrangement used in the co-processor of FIG. 2 for direct exponentiation utilising an auto-indexing pointer.

Utilising a mechanism as shown in FIG. 6 below, an automatic RAM pointer and downloading mechanism 600 obviates the need for CPU intervention. The data in RAM 610 is referenced by the RAM pointer 620 and transferred to the serial interface 630 and clocked out. The RAM pointer 62 automatically increments in readiness for the next data transfer. This scheme has the further advantage in that it allows greater flexibility in handling varying key lengths. The co-processor 640 performs a 32-bit by 512-bit multiply per rotation. The number of rotations is determined by the key length. The improved scheme allows the key length to be varied in increments of 32 bits. Once the key length is chosen the number of rotations required for the calculation is automatically determined as a multiple of 32 bits (e.g. 384/32=12 rotations).

FIG. 2 shows the general arrangement for the improved co-processor. All data paths are 2 bits wide (unless a wider bit width is clearly required, such as at the 32-bit inputs to the multipliers Mul1 and Mul2) to allow bit pair operations. The intermediate S value and the B value are stored in dual port RAM as these storage areas are overwritten at various stages of the calculation.

Direct Exponentiation

In the known co-processor, in order to perform exponentiation operations as required for RSA Public Key systems, the CPU has to regulate the exponentiation process under software control by examining each exponent bit in sequence. The current bit is used to decide whether to perform a modular square or a modular multiply. The exponent value is stored in memory and is read by the CPU one byte at a time as needed. The current bit value is determined by an instruction sequence. As the co-processor requires the CPU to provide the A value during the modular operation, the determination of the exponent bit can only happen between modular operations. Only then can the CPU control the co-processor mode of operation.

FIG. 6, shows that by making use of similar automatic RAM pointing mechanism to that described previously, the co-processor 640 is now controlled automatically during the exponentiation process. At the end of each modular operation (square or multiply), a signal, EOP is generated by the co-processor. This causes the control logic 650 to shift the pointer in the counter register 620 to the next exponent bit. In this way, the next modular operation can be selected and started immediately without the intervention of the CPU. If the exponent bit is a logical 1, two modular operations (square followed by multiply) are performed.

Typical performance times (CPU time, co-processor time and total time) for the new co-processor processing different lengths of signature using the Chinese Remainder Theorem are:

TABLE 2

|  | CPU (CRT) | Co-processor | Total |
|---|---|---|---|
| 512 bit CRT Signature | 34 mS | 46 mS | 80 mS |
| 768 bit CRT Signature | 82 mS | 168 mS | 250 mS |
| 1024 bit CRT Signature | 220 mS | 340 mS | 560 mS |

The improvements provided by the new co-processor arrangement are readily apparent from a comparison of the times in Table 2 with those for the known processor presented in Table 1 above.

Additional Arithmetic Operations

In order to further reduce the CPU overhead required in the new co-processor arrangement, two additional arithmetic operations have been added to the co-processor, namely an addition and a subtraction function.

Addition

In the new co-processor, values stored in the B-RAM and S-RAM may be summed together. Referring to FIG. 2, multiplexers Mx2, Mx6 are set to give a logical 0 output. This means that the output from Sub1 is equal to the input, bstr. Likewise for subtracter Sub2, the output will be equal to the input, sstr. Data from the B-RAM (bstr) and S-RAM (sstr) are fed serially through subtracters Sub1 and Sub2. The output from Sub1 (bstr) is fed to adder Add1 via multiplexer Mx3, where it is summed with the output from Sub2 (sstr). The result is returned via multiplexers Mx7 and Mx8 to the B-RAM.

Subtraction

Values stored in the S-RAM or N-RAM may be optionally subtracted from the value stored in the B-RAM. Referring to FIG. 2, in either case, the data from either the S-RAM or N-RAM is fed serially via multiplexer Mx2 to subtracter Sub1, where it is subtracted from the value stored in the B-RAM. The result is fed back via multiplexers Mx7 and Mx8 to either the S-RAM or B-RAM.

The inclusion of these additional functions allows an efficient implementation of modular exponentiation using the Chinese Remainder Theorem, as outlined below.

CRT Engine

If the prime factors of the modulus N are known, the CRT may be used to reduce the computation time for a given RSA signature process. The Chinese Remainder Theorem and its application in generating an RSA signature, is given in Appendix 2. With the known co-processor architecture, there is still a significant CPU overhead in using the CRT technique. This is because the co-processor is first used to evaluate $r_p = M_p^r$ (modp) and $r_q = M_q^s$ (modq). The final result is then evaluated under software control by the CPU. The processing times given immediately above (Table 2) show the significant CPU contribution to the performance degradation.

Figure 7:
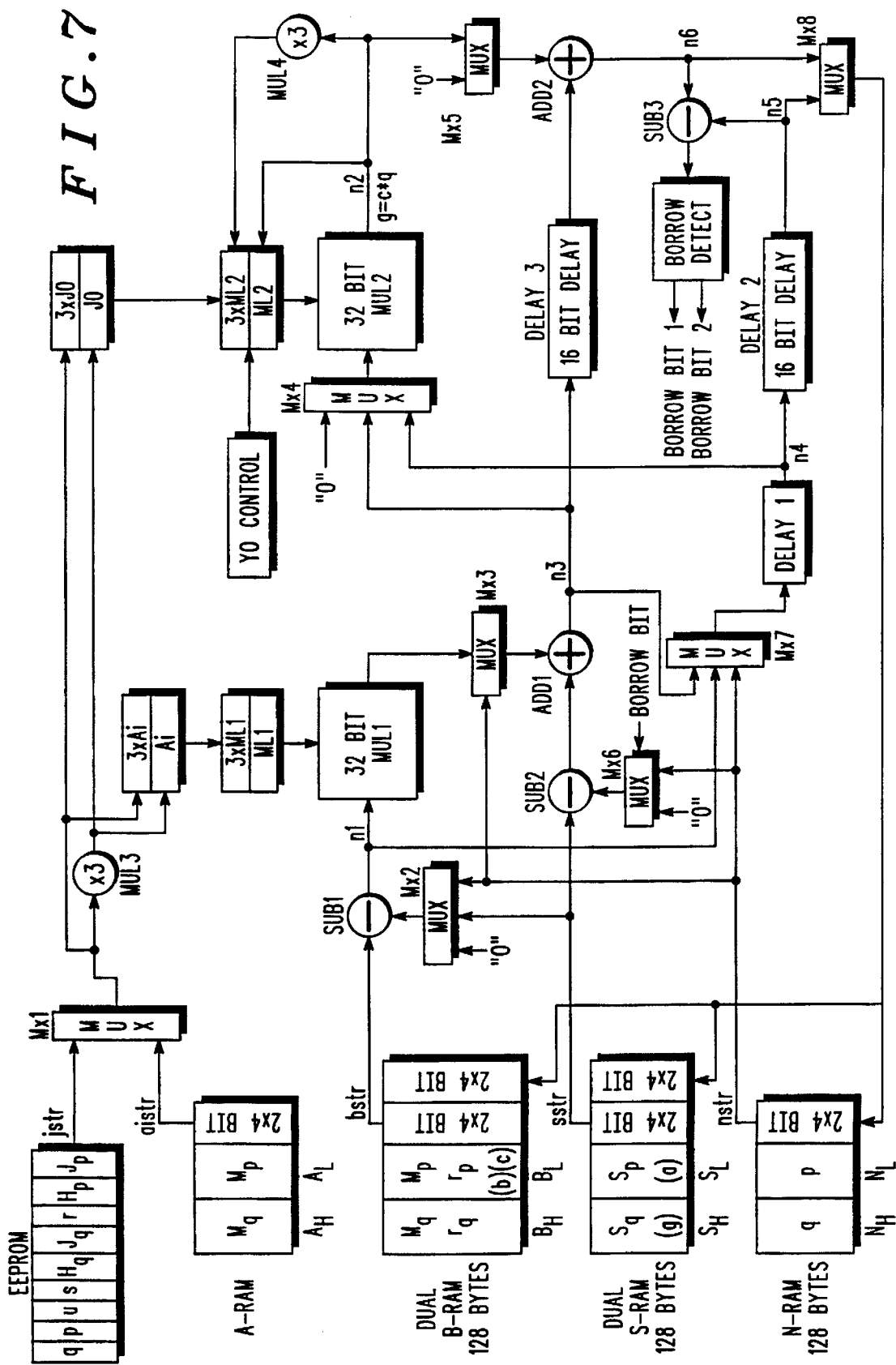
FIG. 7 shows a block schematic diagram illustrating the use of the co-processor of FIG. 2, in implementing the Chinese Remainder Theorem.

The inclusion of the addition and subtraction arithmetic functions to the new co-processor's exponentiation functions, as described previously, allows the co-processor to act as a CRT engine in a way that allows this CPU overhead to be drastically reduced. FIG. 7, shows how this is implemented.

If the prime factors of N are known, then in order to compute $R = M^d$ (modN) using the Montgomery Method and CRT, use is made of the following pre-calculated values: u, $J_p$, $J_q$, $H_p$, $H_q$, r=d mod(p-1) and s=d mod(q-1). These values in a smartcard device would typically be stored in the EEPROM. The following sequence of calculations is followed:

$$M_p = M \ (modp) \quad (1)$$

$$M_q = M \ (modq) \quad (2)$$

$$r_p = M_p^r \ (modp) \quad (3)$$

$$r_q = M_q^s \ (modq) \quad (4)$$

$$a = r_q \ (modp) \quad (5)$$

$$b = r_p - a \quad (6)$$

$$c = b*u \ (modp) \quad (7)$$

$$g = c*q \quad (8)$$

$$R = g + r_q \quad (9)$$

The new co-processor architecture as described above, now has all of the necessary functionality to be able to efficiently calculate the required result using the CRT method. Appropriate sequencing of events to allow the new co-processor to perform this calculation are described below. The control of the sequence may be under software control using the CPU. In this case the CPU overhead is now minimal, otherwise control of the sequence of calculations may be done using a dedicated hardware state machine.

In the above sequence of calculations, operations (1), (2), (3), (4), (5) and (7) are all modular operations that use the Montgomery Algorithm and use the co-processor as a modular multiplier. The memory pointing mechanism of the new co-processor now allows these intermediate results to be returned to pre-designated locations within memory in readiness for subsequent stages of the CRT calculation.

Stage (8) uses the ordinary multiply function, whilst stages (6) and (9) make use of the new arithmetic operations that are now available within the new co-processor, namely, addition and subtraction.

CRT Engine Operation

Reference is now made to FIG. 7. For the purposes of the following description, the A-RAM area, B-RAM area, N-RAM and S-RAM area are divided into regions $A_L$ and $A_H$, $B_L$ and $B_H$, $N_L$ and $N_H$, $S_L$ and $S_H$ respectively.

The message M is first stored in the B-RAM and the prime factors p and q are stored in memory N-RAM areas $N_L$ and $N_H$ respectively. The message M is then multiplied by 1 modulo p to give the result $M_p$. This value is initially returned to the S-RAM area, $S_L$ and then transferred to the A-RAM area $A_L$. In a similar fashion the value $M_q$ is calculated and returned to S-RAM area $S_H$ after which it is transferred to A-RAM area $A_H$.

$M_p$ and $M_q$ are next loaded into the B-RAM areas $B_L$ and $B_H$ respectively in preparation for the following exponentiation process.

The two modular exponentiations of $M_p^r$(modp) and $M_q^s$(modq) are then performed using the newly incorporated exponentiation functions and the results $r_p$ and $r_q$ are stored in $B_L$ and $B_H$, overwriting the values $M_p$ and $M_q$ respectively.

Next the value a=$r_q$(modp) is calculated. This is done by multiplying $r_q$ times 1 modulo p. The result is stored for convenience in $S_H$.

Next the value b=($r_p$-a) is calculated. This is carried out by invoking the newly incorporated subtraction function and the result is returned to $B_L$, overwriting $r_p$.

Next c=b*u (modp) is calculated. This is a modular multiplication with the result being returned to $B_L$, overwriting the value b on the final rotation.

Next the product g=c*q is formed by invoking the ordinary multiply function. The result is stored in S-RAM area, S.

Finally the result $R=g+r_q$ is calculated by applying the newly incorporated addition function. This value is returned to either the S-RAM or B-RAM.

It will be appreciated that various modifications to the above described new co-processor will be apparent to a person of ordinary skill in the art, and may be made without departing from the scope of the invention as set out in the following claims.

Appendix 1
Montgomery Modular Reduction Technique

The Montgomery function $P(A.B)_N$ performs a multiplication modulo N of the product A.B into the P field. The retrieval from the P field back into the normal modular field is performed by enacting P on the result of $P(A.B)_N$ and a precalculated constant H.

Thus if $P==P(A.B)_N$, then $P(P.H)_N==A.B \pmod{N}$.

Proof

We require to calculate R=A.B (modN).

First find Q, such that:

$$P2^n = A.B + Q.N \text{ (where } N \text{ is odd)} \quad (1)$$

Note:

$$I.2^n == 1 (\text{mod} N) \text{ (and } n \text{ is the bit length of } N) \quad (2)$$

Multiply equation (1) by I to give:

$$P.I.2^n = A.B.I + Q.I.N \quad (3)$$

Consider the left side of (3), from (2):

$$P.I.2^n == P(\text{mod} N) \quad (4)$$

Consider the right side of (3), then from (4):

$$P == \{A.B.I + Q.I.N\}(\text{mod} N), \text{ and therefore:}$$

$$P == A.B.I(\text{mod} N) = P(A.B)_N \quad (5)$$

Consider P(P.H)N then from (5):

$$P(P.H)_N == A.B.I^2.H(\text{mod} N) \quad (6)$$

Clearly if H is defined as $I^{-2}$ then:

$$R == P(P.H)_N == A.B(\text{mod} N) \quad (7)$$

Equation (7) gives the desired result.

From (2) above, $H=2^{2n}$ (modN) and is a precalculated constant depending only on N and n.

It next requires that Q be found. From (1) it can be seen that:

$$\{A.B.I + Q.I.N\}(\text{mod} 2^n) = 0 \quad (8)$$

This implies:

$$A.B.I(\text{mod} 2^n) = -Q.I.N(\text{mod} 2^n) \text{ and therefore,}$$

$$Q == -N^{-1} A.B(\text{mod} 2^n) \quad (9)$$

For odd N, $J=N^{-1}$ such that $N.J=I.2^n+1$. Hence $Q==-A.B.J$ (mod$2^n$). Note, J is also a precalculated constant depending only on N and n.

Appendix 2
Chinese Remainder Theorem

The Chinese Remainder Theorem may be stated as follows. For a given set of integers $m_0, m_1, m_2, \ldots, m_k$ such that $\gcd(m_1, m_2, m_3, \ldots, m_k)=1$, then for any set of integers $r_0, r_1, r_2, \ldots, r_k$ such that $r_i < m_i$ (0<i<k), there exists a unique integer X such that X $(\text{mod} m_i) = r_i$ (0<i<k) and $X < m_0 m_1 m_2 \ldots m_k$.

Chinese Remainder Theorem as Applied to RSA

In the RSA system the modulus N is the product of two large prime factors, p and q. As p and q are prime, then gcd(p, q)=1 {gcd=greatest common divisor}.

Therefore, for some integers $r_p$ and $r_q$ such that $r_p<p$ and $r_q<q$, there exists a unique integer R (R<N) such that R (modp)=$r_p$ and R (modq)=$r_q$.

In general we have:

$$(M \text{ mod} N) \text{mod} p = X \text{mod} p = r_p$$

$$(M \text{ mod} N) \text{mod} q = X \text{mod} q = r_q$$

Suppose that $R=M^d$ (modN), then we can use the Chinese Remainder Theorem as follows:

$$r_p = R \text{mod} p = (M^d(\text{mod} N)) \text{mod} p$$

$$r_q = R \text{mod} q = (M^d(\text{mod} N)) \text{mod} q$$

Also suppose d=k*(p-1)+r, then by the Euler-Fermat Theorem $$r_p = (M^{p-1})^k M^r(\text{mod} p) = 1^k M^r(\text{mod} p) = (M \text{mod} p)^r \text{mod} p$$

Similarly if d=j*(q-1)+s, $$r_q = (M^{q-1})^j M^s(\text{mod} q) = 1^j M^s(\text{mod} q) = (M \text{ mod} q)^s \text{mod} q$$

Also, r=d(mod(p-1)) and s=d(mod(q-1))

Hence in order to calculate R, where $R=M^d$(modN)

1) Compute:
   a) $r_p = (M \text{ mod} p)^{d \text{ mod}(p-1)}$ modp
   b) $r_q = (M \text{ mod} q)^{d \text{ mod}(q-1)}$ modq
2) Find u with 0<u<p and,
   u*q=1(modp)
3) Use one of:
   a) $R=(((r_p-(r_q \text{ mod} p)) * u) \text{ mod} p) * q + r_q$
      (where a>$r_q$ modp)
   b) $R=(((r_p+p-(r_q \text{ mod} p)) * u) \text{ mod} p) * q + r_q$
      (where a<rq modp)

Thus the problem of calculating $R=M^d$ (modN), where M, N and d are n binary digit values, is reduced to one of calculating two values $r_p$ and $r_q$ involving n/2 binary digit values. This represents a considerable saving in computation time.

What is claimed is:

1. A co-processor for performing modular multiplication comprising:

means for receiving B and N binary data streams;

means for receiving a data value A;

adder means, subtractor means and multiplier means coupled to sequentially process the B and N binary data streams and the data value A to produce a modulo-reduced multiplication value (A*B) mod N;

wherein the means for receiving the binary data streams comprises:

random access memory for holding B and N values;

parallel-serial interface means for receiving parallel data from the random access memory and for producing therefrom the binary data streams B and N; and an auto-indexing random access memory pointer for sequentially referencing a plurality of random access memory locations holding sequential portions of the B and N values.

2. A co-processor according to claim 1 wherein the co-processor is arranged to perform a number of processing iterations dependent upon the number of random access memory locations holding the B and N values.

3. A co-processor according to claim 1 further comprising exponentiation means, the exponent means comprising:

random access memory for holding an exponent value;

parallel-serial interface means for receiving in parallel from the random access memory the exponent value and for producing therefrom a binary data stream E;

control means for receiving the binary data stream E and for initiating a square or a multiply operation in dependence on the value of each bit thereof.

4. A co-processor according to claim 3 wherein the exponentiation means further comprises an auto-indexing random access memory pointer for sequentially reference a plurality of random access memory locations holding sequential portions of the exponent value.

5. A co-processor according to claim 3 arranged to perform the Chinese Remainder Theorem.

6. A co-processor according to claim 1 arranged to perform the Chinese Remainder Theorem.

7. A co-processor according to claim 1 wherein the co-processor further comprises:

splitter means for splitting each of the B and N binary data streams into component data streams comprising respectively alternate bits of the binary data streams; and the adder means, subtractor means and multiplier means are arranged to process the component data streams in parallel.

* * * * *